United States Patent
Lee et al.

(10) Patent No.: US 12,359,589 B2
(45) Date of Patent: Jul. 15, 2025

(54) APPARATUS USING ROOT CAUSE ANALYSIS FOR PREDICTING BLADE DAMAGE AND METHOD THEREFOR

(71) Applicant: DOOSAN ENERBILITY CO., LTD., Changwon (KR)

(72) Inventors: Seung Min Lee, Changwon (KR); Luke Park, Yongin (KR); Beom Cheol Hwang, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/828,175

(22) Filed: Sep. 9, 2024

(65) Prior Publication Data

US 2025/0116204 A1   Apr. 10, 2025

(30) Foreign Application Priority Data

Oct. 6, 2023   (KR) .......................... 10-2023-0133642

(51) Int. Cl.
  *F01D 21/00*   (2006.01)
  *F02C 9/00*   (2006.01)
(52) U.S. Cl.
  CPC .............. *F01D 21/003* (2013.01); *F02C 9/00* (2013.01); *F05D 2260/81* (2013.01); *F05D 2270/821* (2013.01)

(58) Field of Classification Search
  CPC ...... F01D 21/003; F02C 9/00; F05D 2260/81; F05D 2270/821; F05D 2230/72; F05D 2230/80
  See application file for complete search history.

(56) References Cited

U.S. PATENT DOCUMENTS

| | | | |
|---|---|---|---|
| 9,031,824 B2 | 5/2015 | Nasle | |
| 2007/0271023 A1* | 11/2007 | Morris | F01D 21/003 701/100 |
| 2019/0338666 A1* | 11/2019 | Finn | G06T 3/4038 |
| 2021/0254497 A1* | 8/2021 | El Haloui | G01M 5/0041 |
| 2023/0315932 A1* | 10/2023 | Yang | F01D 5/34 703/7 |

FOREIGN PATENT DOCUMENTS

| | | |
|---|---|---|
| KR | 10-2017-0122024 A | 11/2017 |
| KR | 10-2022-0120395 A | 8/2022 |

* cited by examiner

*Primary Examiner* — Elton K Wong
(74) *Attorney, Agent, or Firm* — Harvest IP Law, LLP

(57) ABSTRACT

Proposed are an apparatus using root cause analysis (RCA) for predicting blade damage and a method therefor. The method for predicting damage includes generating a reduced-order model that derives damage information indicating damage to a blade according to operation conditions of a gas turbine apparatus and a displacement of the blade, measuring the displacement of the blade through a displacement measurement sensor when an operation of the gas turbine apparatus begins under the operation conditions according to a user's input, and deriving the damage information corresponding to the operation conditions and the displacement of the blade through the reduced-order model.

20 Claims, 12 Drawing Sheets

APPARATUS USING ROOT CAUSE ANALYSIS FOR PREDICTING BLADE DAMAGE AND METHOD THEREFOR

CROSS REFERENCE TO RELATED APPLICATION

The present application claims priority to Korean Patent Application No. 10-2023-0133642, filed on Oct. 6, 2023, the entire contents of which are incorporated herein for all purposes by this reference.

BACKGROUND

Technical Field

The present disclosure relates to a technology for predicting damage to a blade and, more specifically, to an apparatus using root cause analysis (RCA) for predicting damage to a blade and a method therefor.

Description of the Related Art

Recently, the term digital twin has been used in daily life and various fields such as ports, transportation, buildings, energy, and shipbuilding. As a digital twin is used in the process of building and operating a smart city, it is also exposed to citizens in their daily lives and appears on subway and highway billboards to reach people. The superficial form of a digital twin may be to make a virtual twin object in the virtual world for a physical object in the real world, and to make the behavior and actions of the physical object a role model for the performance of the virtual twin object, so that the real world can be simulated and mirrored in the virtual world. Digital twins have been used in part in the manufacturing field since the concept was first introduced in 2002, and have recently gained attention in several industries.

The digital twin is a technology that continuously adapts and optimizes a system by exactly simulating real-world objects, systems, and environments within a virtual space in a software system, enabling dynamic motion characteristics and resulting changes of real objects and systems to be simulated in the software system, applying the optimal state according to the simulation results to the real system, and allowing changes in the real system to be transmitted back to the virtual system.

SUMMARY

An objective of the present disclosure is to provide an apparatus using root cause analysis for predicting a maintenance time and a method therefor.

A method for predicting damage according to a preferred exemplary embodiment of the present disclosure in order to achieve the objective described above includes generating a reduced-order model that derives damage information indicating damage to a blade according to an operation condition of a gas turbine apparatus and a displacement of the blade, measuring the displacement of the blade through a displacement measurement sensor when an operation of the gas turbine apparatus begins under the operation condition according to a user's input, deriving the damage information corresponding to the operation condition and the displacement of the blade through the reduced-order model, and controlling the operation of the gas turbine apparatus for a maintenance based on the derived damage information.

The deriving the damage information may include inputting the operation condition and the displacement of the blade to the reduced-order model, deriving physical characteristics of the blade corresponding to the operation condition and the displacement of the blade by the reduced-order model, and deriving the damage information corresponding to the physical characteristics by the reduced-order model.

The generating the reduced-order model may include generating a plurality of virtual blades, each having different damage information including a type of damage and geometric characteristics, deriving the displacement for each of the plurality of virtual blades according to each of a plurality of operation conditions through numerical analysis, deriving the physical characteristics for each of the plurality of virtual blades corresponding to each of the plurality of operation conditions through numerical analysis, constructing a database by mapping the displacement, the physical characteristics, and the damage information of each of the plurality of virtual blades to each operation condition, and generating the reduced-order model on the basis of the database by the model generation unit.

The deriving the physical characteristics may include deriving a pressure imposed on a virtual blade through fluid analysis, deriving a temperature of the virtual blades through heat transfer analysis for the virtual blades under the pressure, and deriving a stress imposed on the virtual blades through structural analysis for the virtual blades under the pressure and the temperature.

The damage information may include the type of damage and the geometric characteristics, and the method may further include displaying the physical characteristics of the blade, the type of damage, and the geometric characteristics on a screen after the deriving the damage information.

The method further includes deriving a maintenance time corresponding to the derived damage information, and outputting a maintenance command to perform the maintenance according to the derived maintenance time, after the deriving the damage information.

The deriving the maintenance time may derive the maintenance time according to the type of damage and the geometric characteristics of the damage information.

The type of damage may include cracks, dents, deformation, and metal loss.

The geometric characteristics may include a location, a shape, and a size of damage.

The displacement of the blade may represent a range where a tip of the blade swings in an axial direction of a rotation shaft relative to a predetermined reference position.

An apparatus for predicting damage according to a preferred exemplary embodiment of the present disclosure in order to achieve the objective described above includes a model generation unit generating a reduced-order model that derives damage information indicating damage to a blade according to an operation condition of a gas turbine apparatus and a displacement of the blade, a measurement unit measuring the displacement of the blade through a displacement measurement sensor when an operation of the gas turbine apparatus begins under the operation conditions according to a user's input, an analysis unit deriving the damage information corresponding to the operation condition and the displacement of the blade through the reduced-order model, and a maintenance unit controlling the operation of the gas turbine apparatus for a maintenance based on the derived damage information.

The analysis unit may input the operation condition and the displacement of the blade to the reduced-order model, and the reduced-order model may derive physical characteristics of the blade corresponding to the operation condition and the displacement of the blade, and derive the damage information corresponding to the physical characteristics.

The model generation unit may generate a plurality of virtual blades, each having different damage information including a type of damage and geometric characteristics, derive the displacement for each of the plurality of virtual blades according to each of a plurality of operation conditions through numerical analysis, derive the physical characteristics for each of the plurality of virtual blades for each operation condition through numerical analysis, construct a database by mapping the displacement, the physical characteristics, and the damage information of each of the plurality of virtual blades to each operation condition, and generate the reduced-order model on the basis of data from the database.

The model generation unit may derive a pressure imposed on the virtual blades through fluid analysis for a virtual blade, derive a temperature of the virtual blade through heat transfer analysis for the virtual blade under the pressure, and derive a stress imposed on the virtual blade through structural analysis for the virtual blade under the pressure and the temperature.

The damage information may include the type of damage and the geometric characteristics, and the apparatus further includes an expression unit displaying the physical characteristics of the blade, the type of damage, and the geometric characteristics on a screen.

The maintenance unit derives a maintenance time corresponding to the derived damage information, and outputs a maintenance command to perform the maintenance according to the derived maintenance time.

The maintenance unit may derive the maintenance time according to the type of damage and the geometric characteristics of the damage information.

The type of damage may include cracks, dents, deformation, and metal loss.

The geometric characteristics may include a location, a shape, and a size of damage.

The displacement of the blade may represent a range where a tip of the blade swings in an axial direction of a rotation shaft relative to a predetermined reference position.

The present disclosure may implement a digital twin for an apparatus through a reduced-order model, and can derive, visualize, and provide the type of damage and the geometric characteristics of the blade in real time according to the displacement of the blade for each operation condition. Accordingly, it is possible to efficiently establish a maintenance plan and perform maintenance.

DETAILED DESCRIPTION OF THE DISCLOSURE

Since the present disclosure may be modified in various ways and may have various exemplary embodiments, specific exemplary embodiments will be exemplified and explained in detail in the following description. However, this is not intended to limit the present disclosure to specific exemplary embodiments, and it should be understood that all modifications, equivalents, or substitutes are included in the scope of the present disclosure.

The terms used in the present disclosure are used only to describe a specific exemplary embodiment and are not intended to limit the present disclosure. Singular expressions include plural expressions unless the context clearly indicates otherwise. In the present disclosure, terms such as "include" or "have" are intended to specify that there exists a feature, number, step, operation, component, part, or combination thereof described in the specification, and should be understood as not precluding the existence or additional possibility of one or more other features or numbers, steps, operations, components, parts, or combinations thereof.

Figure 1:
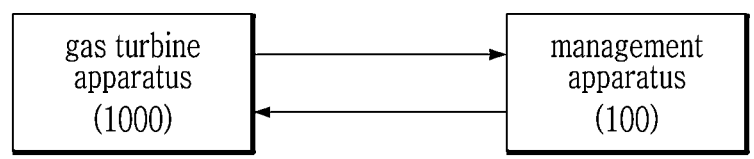
FIG. 1 is a view for explaining a configuration of a system using root cause analysis for predicting damage to a blade.
Figure 2:
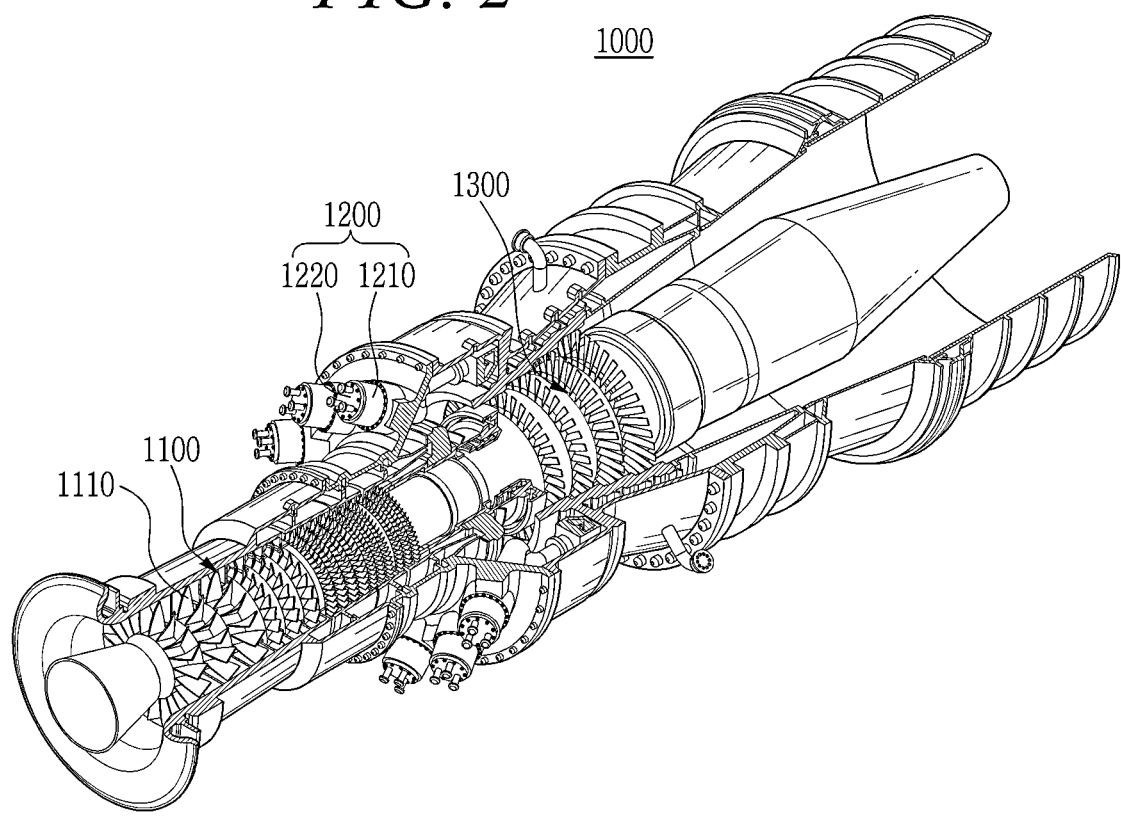
FIG. 2 is a partially sectioned perspective view of a gas turbine apparatus according to an exemplary embodiment of the present disclosure.
Figure 3:
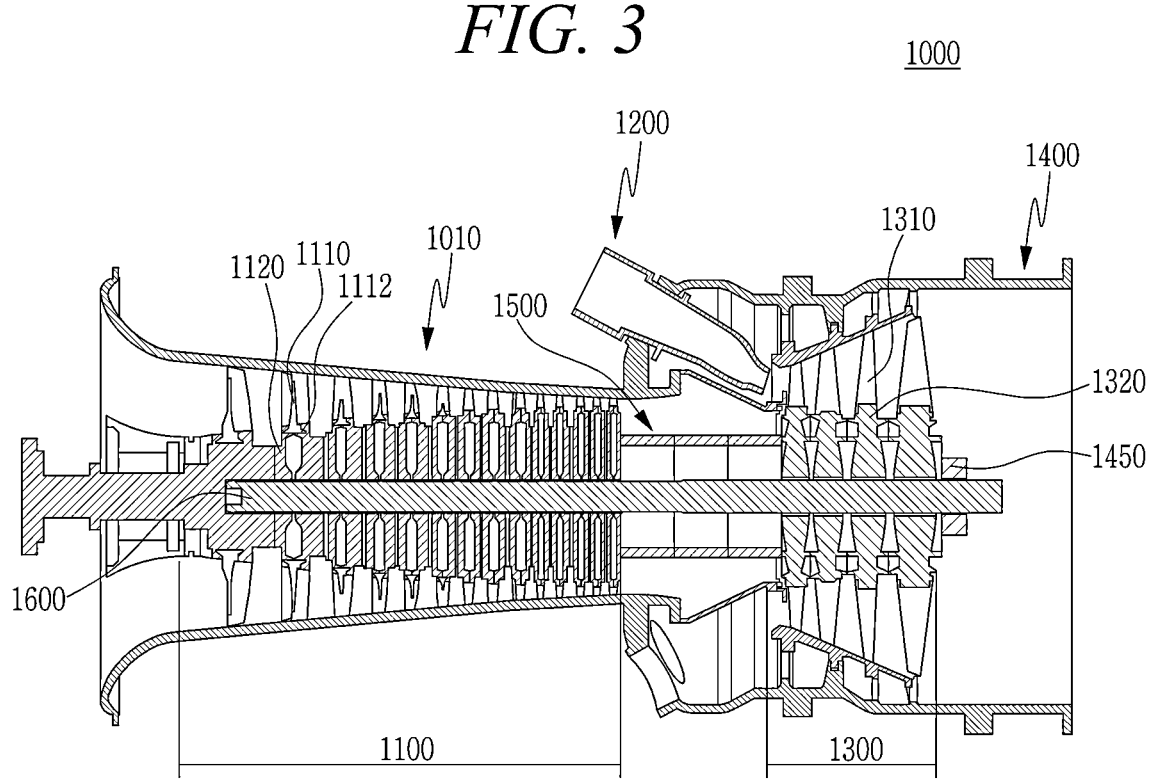
FIG. 3 is a cross-sectional view showing a schematic structure of a gas turbine apparatus according to an exemplary embodiment of the present disclosure.
Figure 4:
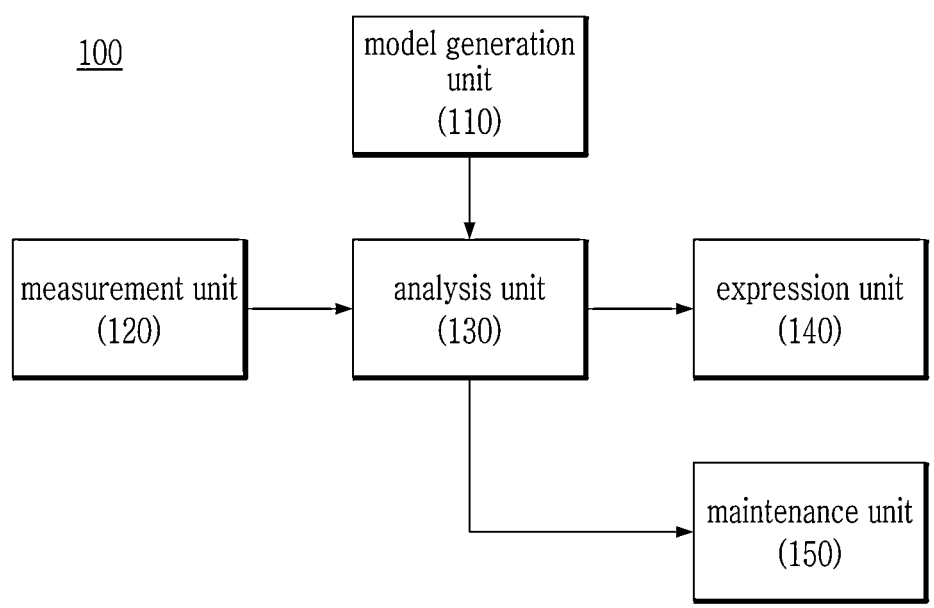
FIG. 4 is a view for explaining a configuration of a system using root cause analysis for predicting damage to a blade according to an exemplary embodiment of the present disclosure.
Figure 5:
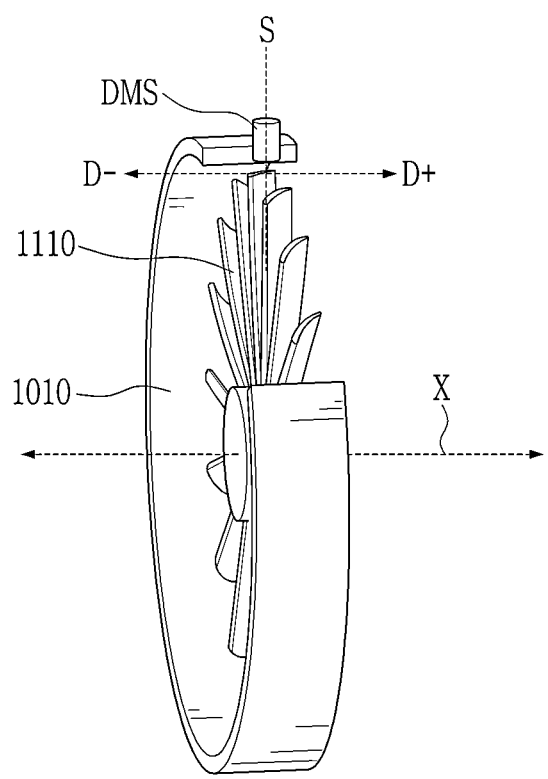
FIG. 5 is a view for explaining a displacement measurement sensor for predicting damage to a blade using root cause analysis according to an exemplary embodiment of the present disclosure.

First, a system using root cause analysis for predicting damage to a blade according to an exemplary embodiment of the present disclosure will be described. FIG. 1 is a view for explaining a configuration of a system using root cause analysis for predicting damage to a blade. FIG. 2 is a partially sectioned perspective view of a gas turbine apparatus according to an exemplary embodiment of the present disclosure, and FIG. 3 is a cross-sectional view showing a schematic structure of a gas turbine apparatus according to an exemplary embodiment of the present disclosure. FIG. 4 is a view for explaining a configuration of a system using root cause analysis for predicting damage to a blade according to an exemplary embodiment of the present disclosure. FIG. 5 is a view for explaining a displacement measurement sensor for predicting damage to a blade using root cause analysis according to an exemplary embodiment of the present disclosure.

Referring to FIG. 1, a management apparatus 100 according to an exemplary embodiment of the present disclosure may derive damage information of the blade 1110 of the gas turbine apparatus 1000 on the basis of the displacement of the blade 1110 of the gas turbine apparatus 1000 derived through the surrogate model. The damage information may include a type of damage and geometric characteristics. In addition, the management apparatus 100 may display the derived damage information in a digital twin method. Also, the management apparatus 100 may derive a maintenance time according to the damage information so that maintenance may be performed in a timely manner.

Referring to FIGS. 2 and 3, the gas turbine apparatus 1000 may include a compressor 1100, a combustor 1200, and a turbine 1300. The compressor 1100 may be provided with a plurality of blades 1110 installed radially. The compressor 1100 may rotate the blade 1110 so that the air is compressed and moved by the rotation of the blades 1110. The size and installation angle of the blade 1110 may vary depending on the installation location. In an exemplary embodiment, the compressor 1100 may be directly or indirectly connected to the turbine 1300, and receive a portion of the power generated by the turbine 1300 and utilize the same for rotating the blade 1110.

The air compressed in the compressor 1100 may move to the combustor 1200. The combustor 1200 may include a plurality of combustion chambers 1210 arranged in an annular shape and a fuel nozzle module 1220.

As shown in the drawing, the gas turbine apparatus 1000 according to an exemplary embodiment of the present disclosure may be provided with a housing 1010, wherein a diffuser 1400 through which combustion gas passing through the turbine is discharged is provided at the rear side of the housing 1010. In addition, a combustor 1200 for receiving and combusting compressed air may be disposed in front of the diffuser 1400.

Explaining on the basis of the direction of air flow, a compressor 1100 may be located on the upstream side of the housing 1010, and a turbine 1300 may be disposed on the downstream side. In addition, a torque tube unit 1500 may be disposed between the compressor 1100 and the turbine 1300 as a torque transmission member that transmits a rotation torque generated in the turbine 1300 to the compressor 1100.

The compressor 1100 may be provided with a plurality of compressor rotor disks 1120, and each compressor rotor disk 1120 may be fastened by a tie rod 1600 so as not to be spaced apart in the shaft direction.

Specifically, each compressor rotor disk 1120 may be aligned with each other along the shaft direction in a state where the tie rod 1600 composing the rotation shaft passes through approximately the center. Herein, each neighboring compressor rotor disk 1120 may be disposed such that the opposite surface thereof is compressed against the tie rod 1600 so that relative rotation is impossible.

A plurality of blades 1110 may be radially coupled to the outer peripheral surface of the compressor rotor disk 1120. Each blade 1110 may be provided with a dovetail portion 1112 and may be fastened to the compressor rotor disk 1120.

A vane (not shown) fixed to and disposed in the housing may be located between each rotor disk 1120. Unlike the rotor disk, such a vane may be fixed not to rotate, and may serve to align the flow of compressed air passing through the blades of the compressor rotor disk and to guide the air to the blades of the rotor disk located on the downstream side.

A fastening method of the dovetail portion 1112 may include a tangential type and an axial type. The method may be selected according to the required structure of a commercially available gas turbine, and may have a commonly known dovetail or fir-tree shape. In some cases, the blade may be fastened to the rotor disk using a fastening device other than the shape above, for example, using a fixing tool such as a key or a bolt.

The tie rod 1600 may be disposed to penetrate the center of a plurality of compressor rotor disks 1120 and turbine rotor disks 1320, and the tie rod 1600 may be composed of one or a plurality of tie rods. One side end of the tie rod 1600 may be fastened within the compressor rotor disk located on the most upstream side, and the other side end of the tie rod 1600 may be fastened by a fixing nut 1450. The shape of the tie rod 1600 may have various structures depending on the gas turbine, so it may be not necessarily limited to the shape shown in FIG. 2. That is, as shown in the drawing, a single tie rod may have a shape penetrating the center of the rotor disk, or a plurality of tie rods may be disposed circumferentially, and a combination thereof may be possible.

Although not shown, in the compressor of the gas turbine, a vane that serves as a guide vane may be installed at the next location of the diffuser in order to adjust the flow angle of the fluid flow entering the inlet of the combustor to the design flow angle after increasing the pressure of the fluid flow, which is called a deswirler.

In the combustor 1200, the incoming compressed air may be mixed with fuel and combusted to generate a high energy, high temperature, high pressure combustion gas, and through the isobaric combustion process, the temperature of the combustion gas may reach the heat resistance limit that the combustor and turbine components can withstand.

The combustors composing the combustion system of the gas turbine may be arranged in a plurality in a housing formed in a cell shape, and may be composed of a burner including a fuel injection nozzle, a combustor liner forming a combustion chamber, and a transition piece that becomes a connection unit between the combustor and the turbine.

Specifically, the liner may provide a combustion space where fuel injected by the fuel nozzle is mixed and combusted with the compressed air of the compressor. Such a liner may include a flame tube that provides a combustion space where the fuel mixed with air is combusted, and a flow sleeve that forms the annular space while surrounding the flame tube. In addition, a fuel nozzle may be coupled to the front end of the liner, and an ignition plug may be coupled to the side wall.

Meanwhile, a transition piece may be connected to the rear end of the liner so that the combustion gas combusted by the ignition plug can be sent toward the turbine. The outer wall of this transition piece may be cooled by compressed air supplied from the compressor in order to prevent damage due to the high temperature of combustion gas.

For this purpose, the transition piece may be provided with holes for cooling so that air can be sprayed into the inside, and the compressed air may cool the main body inside through the holes and then may flow toward the liner.

The cooling air that cools the transition piece described above may flow in the annular space of the liner, and compressed air outside of the flow sleeve may be provided as cooling air through cooling holes provided in the flow sleeve and may collide in the outer wall of the liner.

Meanwhile, the high-temperature and high-pressure combustion gas from the combustor may be supplied to the turbine 1300. The supplied high-temperature and high-pressure combustion gas may cause the rotation torque by giving a reaction force while expanding and colliding with the rotating blade of the turbine, and the rotation torque obtained in such a way may be transmitted to the compressor through the torque tube described above, and the power in excess of the power required for driving the compressor may be used to drive the generator.

The turbine 1300 may be basically similar to the structure of the compressor 1100. That is, the turbine 1300 may be also provided with a plurality of turbine rotor disks 1320 similar to the compressor rotor disk of the compressor 1100. Accordingly, the turbine rotor disk 1320 may also include a plurality of turbine blades arranged radially.

The turbine blade 1310 may also be coupled to the turbine rotor disk 1320 in a dovetail or other manner. Further, a turbine vane (not shown) fixed to the housing 1010 may be provided between the blades of the turbine rotor disk 1320 and guide the flow direction of the combustion gas passing through the blade.

As shown in FIG. 3, the turbine rotor disk 1320 may have a roughly disk-like shape, and a plurality of coupling slots may be formed at an outer peripheral surface thereof. The coupling slot may be formed to have a curved surface of a first-tree shape.

The turbine blade 1310 may be fastened to the coupling slot. In FIG. 3, the turbine blade 1310 may have a platform portion of a flat shape around the center. The platform portion may serve to maintain a gap between the blades by contacting the platform portion of a neighboring turbine blade 1310 and the side surface thereof to each other.

A root portion may be formed on the lower surface of the platform portion. The root portion may have an axial-type shape that is inserted along the shaft direction of the rotor disk 1320 into the coupling slot of the rotor disk 1320 described above.

The root portion may have a curved portion of roughly a fir-tree shape, which is formed to correspond to the shape of the curved portion formed in the coupling slot. Herein, the coupling structure of the root portion may not necessarily have a fir-tree shape, but may be formed to have a dovetail shape.

The blade portion may be formed on the upper surface of the platform portion. The blade portion may be formed to have an airfoil optimized according to the specifications of the gas turbine, and may have a leading edge disposed on the upstream side and a trailing edge disposed on the downstream side on the basis of the flow direction of the combustion gas.

Herein, unlike the blade of the compressor, the blade of the turbine may come into direct contact with the combustion gas of high temperature and high pressure. The temperature of the combustion gas may be high enough to reach 1700° C., so a cooling means may be required. To this end, there may be a cooling passage that extracts compressed air from some parts of the compressor and supplies the same to the blades of the turbine.

The cooling passage may extend from the outside of the housing (an external passage), may extend through the inside of the rotor disk (an internal passage), or may use both external and internal passages. In FIG. 3, a plurality of film cooling holes may be formed on a surface of the blade portion, and the film cooling holes may serve to supply cooling air to the surface of the blade portion while communicating with a cooling channel (not shown) formed inside the blade portion.

Meanwhile, the blade portion of the turbine may be rotated by the combustion gas inside the housing, and a gap may exist between the end side of the blade portion and the inner surface of the housing so that the blade portion may rotate smoothly. However, as described above, the combustion gas may leak through the gap, so a sealing means may be required to block the same.

Both the turbine vane and the turbine blade 1310 may be in the form of airfoil and be composed of a leading edge, a trailing edge, a suction surface, and a pressure surface. The inside of the turbine vane and the turbine blade 1310 may include a complex labyrinth structure that forms the cooling system. The cooling circuit within the vane and the blade may accommodate cooling fluid, for example, air, from the compressor of the turbine engine and the fluid may pass through the end side of the vane and the blade that is coupled to the vane and blade carriers. The cooling circuit may usually include a plurality of flow passages designed to maintain all sides of the turbine vane and blade at a relatively uniform temperature, and at least some of the fluid passing through the cooling circuit may be discharged through openings of the leading edge, the trailing edge, the suction surface, and the pressure surface of the vane. A plurality of cooling channels composing the cooling circuit may be provided inside the vane and the blade, and a metering plate may be provided at the inlet side of the plurality of cooling channels. A cooling hole corresponding to the inlet of each cooling channel may be formed in the metering plate one by one. However, as the cooling fluid passes through the cooling hole of the metering plate, a strong jet may be formed, and in particular, a flow stagnation area may occur in the lower front portion of the leading edge.

Referring to FIG. 4, the management apparatus 100 may be for managing the blade 1110 of the compressor 1100 or the blade of the turbine 1300 of the gas turbine apparatus 1000 described with reference to FIGS. 2 and 3. The management apparatus 100 may include a model generation unit 110, a measurement unit 120, an analysis unit 130, an expression unit 140, and a maintenance unit 150. The blade 1110 of the compressor 1100 will be mainly described as an example in the following exemplary embodiment, but those skilled in the art will understand that the blade of the turbine 1300 may also be managed in the same manner.

The model generation unit 110 may be for generating a reduced-order model (ROM) that derives damage information from the operation condition of the gas turbine apparatus 1000 and the displacement of the blade. To this end, the model generation unit 110 may generate a plurality of virtual blades having different damage information including the type of damage and the geometric characteristics. Each of the plurality of virtual blades may be a three-dimensional model rendered by simulating the type of damage and the geometric characteristics. The model generation unit 110 may derive the displacement for each of the plurality of virtual blades for each of plurality of operation conditions of the gas turbine apparatus 1000 through numerical analysis. Then, the model generation unit 110 may derive physical characteristics for each of the plurality of virtual blades through numerical analysis. Subsequently, the model generation unit 110 may construct a database by mapping the displacement, the physical characteristics, and the damage information of each blade to each operation condition. Also, the model generation unit 110 may generate a reduced-order model (ROM) that derives the damage information from an operation condition and the displacement of the blade on the basis of data recorded in the database having the displacement, the physical characteristics, and the damage information of the blade for each operation condition.

The measurement unit 120 may be for measuring the displacement of the blade through the displacement measurement sensor (DMS) mounted on the gas turbine apparatus 1000 when the operation of the gas turbine apparatus 1000 begins under the operation condition according to a user's input. Herein, the operation condition may include at least one of a start-up scenario (normal/fast), a cooldown time, a load condition (full/partial), and an operation time.

As shown in FIG. 5, the displacement measurement sensor (DMS) may be installed on one side of the housing 1010 of the gas turbine apparatus 1000, facing the tip of the blade 1110. The displacement measurement sensor (DMS) may measure the displacement of the blade 1110. The displacement of the blade may represent a range (from D− to D+) where the tip of the blade 1110 swings in an axial direction of the rotation shaft X relative to a predetermined reference position S.

The analysis unit 130 may be for deriving the damage information corresponding to the operation condition and the measured displacement of the blade through the reduced-order model. Specifically, the analysis unit 130 may input the corresponding operation condition and the measured displacement of the blade to the reduced-order model. Then, the reduced-order model may derive the physical characteristics of the blade corresponding to the inputted operation condition and the measured displacement of the blade. After that, the reduced-order model may derive the damage information corresponding to the physical characteristics. The physical characteristics of the blade may include the pressure imposed on the blade, the temperature of the blade, and the stress imposed on the blade. In addition, the damage information may include the type of damage and the geometric characteristics. The type of damage may include cracks, dents, deformation, and metal loss. Also, the geometric characteristics may include location, shape, size, and the like.

The expression unit 140 may visualize the physical characteristics of the blade derived through the reduced-order model, the type of damage, and the geometric characteristics of the derived damage information and display the same on a screen.

The maintenance unit 150 may derive a maintenance time corresponding to the damage information derived through the reduced-order model, and output a maintenance command to perform a maintenance according to the derived maintenance time. In this case, the maintenance unit 150 may derive the maintenance time set in advance according to the type of damage and the geometric characteristics.

The detailed operations of the management apparatus 100 including the model generation unit 110, the measurement unit 120, the analysis unit 130, the expression unit 140, and the maintenance unit 150 mentioned above will be described below.

Figure 6:
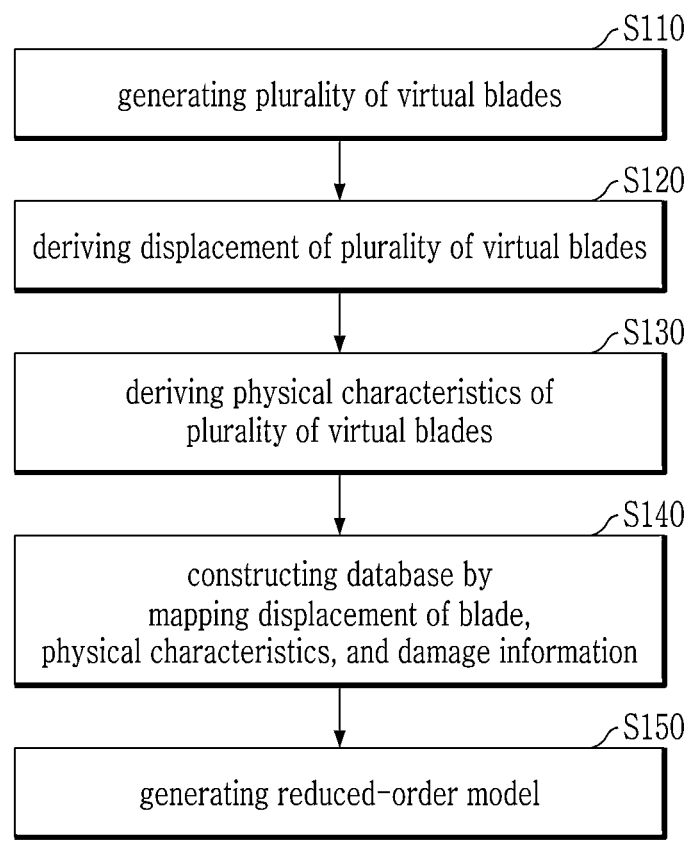
FIG. 6 is a flowchart for explaining a method of generating a model for predicting damage to a blade using root cause analysis according to an exemplary embodiment of the present disclosure.
Figure 7A:
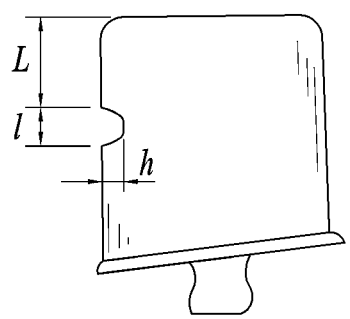
FIGS. 7A to 7D are exemplary screens displaying a variety of virtual blades, each exhibiting distinct types of damage and unique geometric characteristics according to an exemplary embodiment of the present disclosure.
Figure 7B:
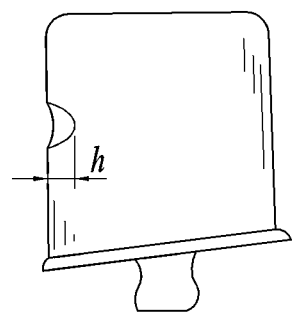
Figure 7C:
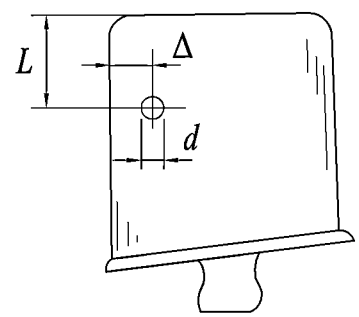
Figure 7D:
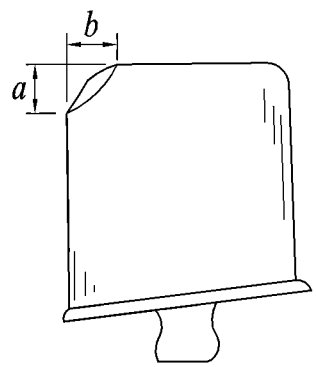

A method for generating a model for predicting damage to a blade using root cause analysis according to an exemplary embodiment of the present disclosure will be described. Specifically, the method of generating the reduced-order model that derives the damage information indicating damage to the blade according to the displacement of the blade 1110 of the gas turbine apparatus 1000 will be described. FIG. 6 is a flowchart for explaining a method of generating a model for predicting damage to a blade using root cause analysis according to an exemplary embodiment of the present disclosure. FIGS. 7A to 7D are an exemplary screen displaying a variety of virtual blades, each exhibiting distinct types of damage and unique geometric characteristics according to an exemplary embodiment of the present disclosure.

Referring to FIG. 6, the model generation unit 110 may generate the plurality of virtual blades, each having different damage information including the type of damage and the geometric characteristics in step S110. The virtual blades may be a three-dimensional model rendered by simulating the type of damage and the geometric characteristics of damage. Herein, the type of damage may include cracks, dents, deformation, metal loss, and the like. In addition, the geometric characteristics may include location, shape, and size. That is, the plurality of virtual blades may have different types of damage and geometric characteristics. FIGS. 7A to 7D are exemplary screens displaying a variety of virtual blades, each exhibiting distinct types of damage and unique geometric characteristics. In each screen, the location, shape and/or size of the damage is indicated with labels, such as L, l, and h in FIG. 7A; h in FIG. 7B; L, A, and d in FIG. 7C; and a and b in FIG. 7D.

Next, the model generation unit 110 may derive the displacements of the plurality of virtual blades for each operation condition of the gas turbine apparatus 1000 through numerical analysis in step S120. That is, the model generation unit 110 may construct a state where a virtual blade is mounted on the gas turbine apparatus 1000 for each of the plurality of virtual blades and operates under various operation conditions through numerical analysis, and may derive the displacement of the blade in that state.

Then, the model generation unit 110 may derive the physical characteristics of the plurality of virtual blades through numerical analysis for the plurality of virtual blades in step S130. In step S130, the model generation unit 110 may derive the pressure imposed on the virtual blades through fluid analysis. Then, the model generation unit 110 may derive the temperature of the virtual blades through heat transfer analysis for the virtual blades under the derived pressure. Subsequently, the model generation unit 110 may derive the stress imposed on the virtual blades through structural analysis for the virtual blades under the pressure and the temperature.

Subsequently, the model generation unit 110 may construct a database by mapping the displacement, the physical characteristics, and the damage information of the blade to each operation condition in step S140.

Next, in step S150, the model generation unit 110 may generate the reduced-order model (ROM) that derives the damage information from the operation condition and the displacement of the blade on the basis of the displacement, the physical characteristics, and the damage information of the blade for each operation condition recorded in the database. That is, in step S150, the model generation unit 110 may generate a first sub-analysis model that derives the physical characteristics of the blade from the operation condition and the displacement of the blade on the basis of data from the database. Then, the model generation unit 110 may generate a second sub-analysis model that derives the damage information from the physical characteristics of the blade on the basis of data from the database. Next, the model generation unit 110 may generate an analysis model that derives the damage information from the operation condition and the displacement of the blade by merging the first sub-analysis model and the second sub-analysis model. Then, the model generation unit 110 may generate the reduced-order model by reducing the order of the governing equation constituting the analysis model.

Figure 8:
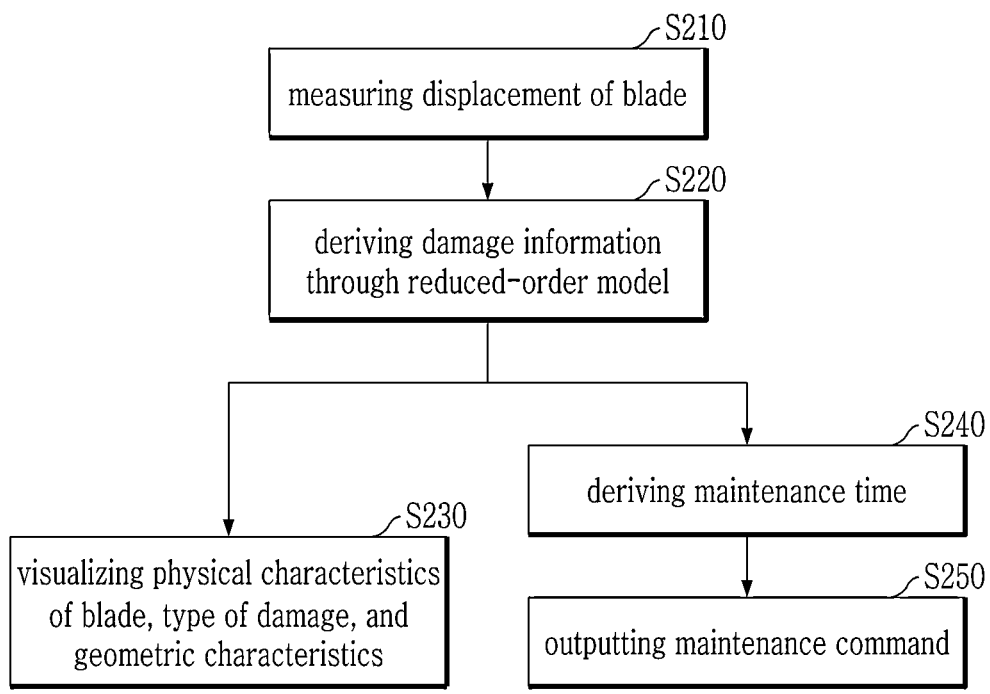
FIG. 8 is a flowchart for explaining a method of predicting damage to a blade using root cause analysis according to an exemplary embodiment of the present disclosure.

Next, a method for predicting damage to the blade using the reduced-order model according to an exemplary embodiment of the present disclosure will be described. FIG. 8 is a flowchart for explaining a method for predicting damage to a blade using root cause analysis according to an exemplary embodiment of the present disclosure. FIGS. 9A to 9D are an exemplary screen displaying various results of predicting damage to the blade using root cause analysis according to an exemplary embodiment of the present disclosure.

Referring to FIG. 8, the measurement unit 120 may measure the displacement of the blade through the displacement measurement sensor (DMS) in step S210 when the operation of the gas turbine apparatus 1000 begins under an operation condition according to a user's input. In this case, the measurement unit 120 may receive the operation condition as an input. Herein, the operation condition may include at least one of a start-up scenario (normal/fast), a cooldown time, a load condition (full/partial), and an operation time.

In addition, the displacement of the blade may represent the range (D− to D+) where the tip of the blade 1110 swings in the axial direction of the rotation shaft X relative to a predetermined reference position S as shown in FIG. 5.

Subsequently, the analysis unit 130 may derive the damage information corresponding to the corresponding operation condition and the measured displacement of the blade through the reduced-order model in step S220.

More specifically, in step S220, the analysis unit 130 may input the corresponding operation condition and the measured displacement of the blade to the reduced-order model. Then, the reduced-order model may derive the physical characteristics of the blade corresponding to the inputted operation condition and the measured displacement of the blade. Herein, the physical characteristics of the blade may include the pressure imposed on the blade, the temperature of the blade, and the stress imposed on the blade. Then, the reduced-order model may derive the damage information corresponding to the physical characteristics. Herein, the damage information may include the type of damage and the geometric characteristics. The type of damage may include cracks, dents, deformation, metal losses, and the like. Also, the geometric characteristics may include location, shape, size, and the like.

In step S230, the expression unit 140 may visualize the physical characteristics of the blade derived through the reduced-order model, the type of damage of the derived damage information, and the geometric characteristics, and may display the same on the screen.

Figure 9A:
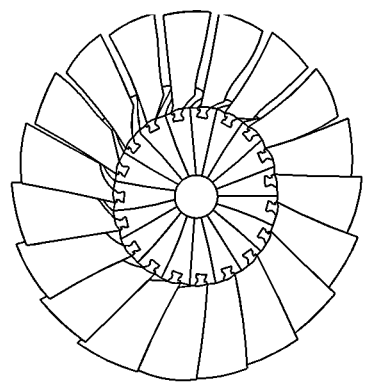
FIGS. 9A to 9D are an exemplary screen displaying various results of predicting damage to a blade using root cause analysis according to an exemplary embodiment of the present disclosure.
Figure 9B:
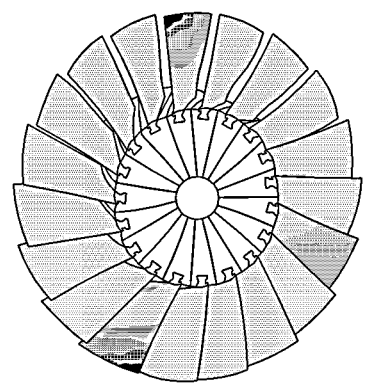
Figure 9C:
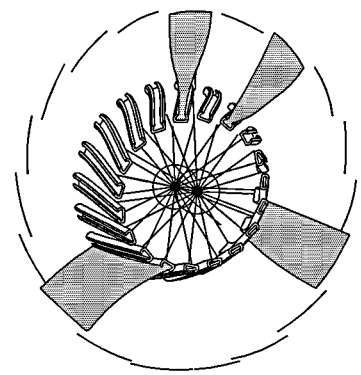
Figure 9D:
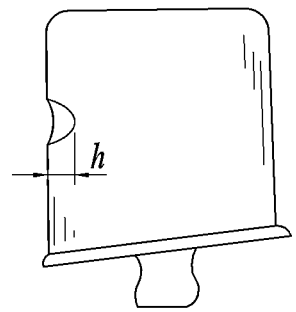

As shown in FIGS. 9A to 9D, for example, when the shape of the actual blade is as depicted in FIG. 9A, the physical characteristics of the blade such as the pressure imposed on the blade, the temperature of the blade, and the stress imposed on the blade may be visualized and displayed as shown in FIG. 9B. In addition, the damaged blade and the type of damage may be displayed as shown in FIG. 9C and the geometric characteristics of damage may be visualized and displayed for the corresponding blade as shown in FIG. 9D.

Meanwhile, the maintenance unit 150 may derive the maintenance time corresponding to the damage information derived in advance in step S240. In this case, the maintenance unit 150 may derive the maintenance time set in advance according to the type of damage and the geometric characteristics.

For example, when metal loss exists as shown in FIG. 9D, the maintenance time may be determined as specified in Table 1 below. For example, in Table 1, h refers to a size of the damage measured from a leading edge toward a trailing edge of the blade in millimeters.

TABLE 1

| Geometric characteristics | Maintenance time |
|---|---|
| h < 1 mm | normal operation |
| h > 1 mm | replacement after a month establishment of maintenance plan |
| h > 3 mm | replacement with 2 weeks |
| h > 5 mm | replacement with 3 days |
| h > 6 mm | immediate replacement |

As described above, when the maintenance time is derived, the maintenance unit 150 may output the maintenance command so that maintenance is performed according to the derived maintenance time in the step S250. The maintenance command may control the operation of the actual gas turbine, including actions such as stopping the turbine, adjusting performance parameters, and modifying operational settings. Meanwhile, the steps S230, S240, and S250 described above may be performed simultaneously, or the steps S240 and S250 may be performed first, and the step S230 may be performed later.

Figure 10:
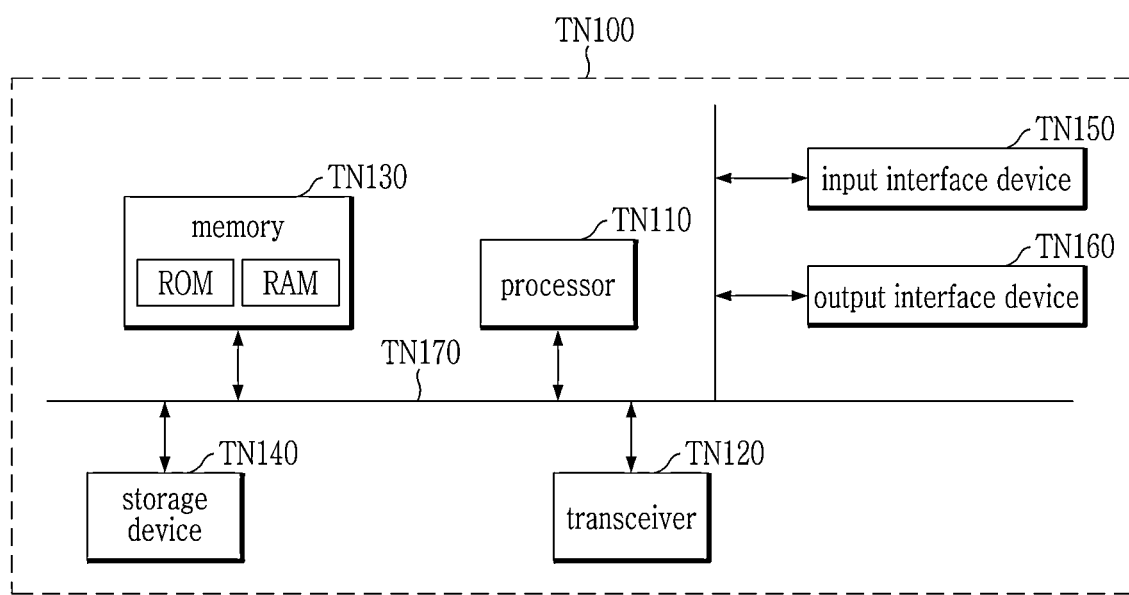
FIG. 10 is a view showing a computing device according to an exemplary embodiment of the present disclosure.

FIG. 10 is a view showing a computing device according to an exemplary embodiment of the present disclosure. A computing device TN100 of FIG. 10 may be the apparatus (e.g., a management apparatus 100 or the like) described in the present specification.

In the exemplary embodiment of FIG. 10, the computing device TN100 may include at least one processor TN110, a transceiver TN120, and a memory TN130. In addition, the computing device TN100 may further include a storage device TN140, an input interface device TN150, an output interface device TN160, and the like. The components included in the computing device TN100 may be connected by a bus TN170 to communicate with each other.

The processor TN110 may execute a program command stored in at least one of the memory TN130 and the storage device TN140. The processor TN110 may refer to a central processing unit (CPU), a graphics processing unit (GPU), or a dedicated processor in which methods according to exemplary embodiments of the present disclosure are performed. The processor TN110 may be configured to implement procedures, functions, and methods described in relation to an exemplary embodiment of the present disclosure. The processor TN110 may control each component of the computing device TN100.

Each of the memory TN130 and the storage device TN140 may store various information in relation to the operation of the processor TN110. Each of the memory TN130 and the storage device TN140 may be composed of at least one of a volatile storage medium and a nonvolatile storage medium. For example, the memory TN130 may be composed of at least one of a read-only memory (ROM) and a random access memory (RAM).

The transceiver TN120 may transmit or receive wired signals or wireless signals. The transceiver TN120 may be connected to a network to perform communication.

Meanwhile, the various methods described above according to an exemplary embodiment of the present disclosure may be implemented in the form of a program readable through various computer means and may be recorded on a computer-readable recording medium. Herein, the recording medium may include a program command, a data file, a data structure, and the like, alone or in combination thereof. The program commands recorded on the recording medium may be designed and configured specially for the present disclosure or may be known and usable by those skilled in the art in computer software. For example, the recording medium may include a magnetic medium such as a hard disk, a floppy disk, and a magnetic tape, an optical medium such as a CD-ROM, and a DVD, a magnetic-optical medium such as a floptical disk, and a hardware device, such as ROM, RAM, and a flash memory, which is specially configured to store and execute program commands. Examples of program commands may include not only machine language such as those created by a compiler but also an advanced language Wire that may be executed by a computer using an interpreter. Such hardware devices may be configured to operate as one or more software modules in order to perform the operations of the present disclosure, and vice versa.

Although exemplary embodiments of the present disclosure have been described above, those skilled in the art can add, change, delete or append components without departing from the spirit of the present disclosure as recited in the following claims, which will be included within the scope of rights of the present disclosure.

What is claimed is:

1. A method for predicting damage, the method comprising:
   generating a reduced-order model that derives damage information indicating the damage to a blade according to an operation condition of a gas turbine apparatus and a displacement of the blade;
   measuring the displacement of the blade through a displacement measurement sensor when an operation of the gas turbine apparatus begins under the operation condition according to a user's input;
   deriving the damage information corresponding to the operation condition and the displacement of the blade through the reduced-order model; and
   controlling the operation of the gas turbine apparatus for a maintenance based on the derived damage information.

2. The method of claim 1, wherein the deriving the damage information comprises:
   inputting the operation condition and the displacement of the blade to the reduced-order model;
   deriving physical characteristics of the blade corresponding to the operation condition and the displacement of the blade by the reduced-order model; and
   deriving the damage information corresponding to the physical characteristics by the reduced-order model.

3. The method of claim 2, wherein the deriving the physical characteristics comprises:
   deriving a pressure imposed on a virtual blade through fluid analysis;
   deriving a temperature of the virtual blade through heat transfer analysis for the virtual blade under the pressure; and
   deriving a stress imposed on the virtual blade through structural analysis for the virtual blade under the pressure and the temperature.

4. The method of claim 1, wherein the generating the reduced-order model comprises:
   generating a plurality of virtual blades, each having different damage information including a type of damage and geometric characteristics;
   deriving the displacement for each of the plurality of virtual blades according to each of a plurality of operation conditions through numerical analysis;
   deriving physical characteristics for each of the plurality of virtual blades for each of the plurality of operation conditions through numerical analysis;
   constructing a database by mapping the displacement, the physical characteristics, and the damage information of each of the plurality of virtual blades to each of the plurality of operation conditions; and
   generating the reduced-order model on the basis of data from the database.

5. The method of claim 1, further comprising:
   displaying physical characteristics of the blade, a type of damage, and geometric characteristics on a screen after the deriving the damage information,
   wherein the damage information comprises the type of damage and the geometric characteristics.

6. The method of claim 1, further comprising:
   deriving a maintenance time corresponding to the derived damage information; and
   outputting a maintenance command to perform the maintenance according to the derived maintenance time, after the deriving the damage information.

7. The method of claim 6, wherein the deriving the maintenance time derives the maintenance time according to a type of damage and geometric characteristics of the damage information.

8. The method of claim 7, wherein the type of damage comprises cracks, dents, deformation, and metal loss.

9. The method of claim 7, wherein the geometric characteristics comprises a location, a shape, and a size of damage.

10. The method of claim 1, wherein the displacement of the blade represents a range where a tip of the blade swings in an axial direction of a rotation shaft relative to a predetermined reference position.

11. An apparatus for predicting damage, the apparatus comprising:
    a model generation unit generating a reduced-order model that derives damage information indicating the damage to a blade according to an operation condition of a gas turbine apparatus and a displacement of the blade;
    a measurement unit measuring the displacement of the blade through a displacement measurement sensor when an operation of the gas turbine apparatus begins under the operation condition according to a user's input;
    an analysis unit deriving the damage information corresponding to the operation condition and the displacement of the blade through the reduced-order model; and
    a maintenance unit controlling the operation of the gas turbine apparatus for a maintenance based on the derived damage information.

12. The apparatus of claim 11, wherein the analysis unit inputs the operation condition and the displacement of the blade to the reduced-order model, and
    the reduced-order model derives physical characteristics of the blade corresponding to the operation condition and the displacement of the blade, and derives the damage information corresponding to the physical characteristics.

13. The apparatus of claim 12, wherein the model generation unit
    derives a pressure imposed on a virtual blade through fluid analysis,
    derives a temperature of the virtual blade through heat transfer analysis for the virtual blade under the pressure, and
    derives a stress imposed on the virtual blade through structural analysis for the virtual blade under the pressure and the temperature.

14. The apparatus of claim 11, wherein the model generation unit generates a plurality of virtual blades, each having different damage information including a type of damage and geometric characteristics,
derives the displacement for each of the plurality of virtual blades according to each of a plurality of operation conditions through numerical analysis,
derives physical characteristics for each of the plurality of virtual blades for each of the plurality of operation conditions through numerical analysis,
constructs a database by mapping the displacement, the physical characteristics, and the damage information of each of the plurality of virtual blades to each of the plurality of operation conditions, and
generates the reduced-order model on the basis of data from the database.

15. The apparatus of claim 11, further comprising: an expression unit displaying physical characteristics of the blade, a type of damage, and geometric characteristics on a screen,
wherein the damage information comprises the type of damage and the geometric characteristics.

16. The apparatus of claim 11, wherein
the maintenance unit further derives a maintenance time corresponding to the derived damage information, and outputs a maintenance command to perform the maintenance according to the derived maintenance time.

17. The apparatus of claim 16, wherein the maintenance unit derives the maintenance time according to a type of damage and geometric characteristics of the damage information.

18. The apparatus of claim 17, wherein the type of damage comprises cracks, dents, deformation, and metal loss.

19. The apparatus of claim 17, wherein the geometric characteristics comprises a location, a shape, and a size of damage.

20. The apparatus of claim 11, wherein the displacement of the blade represents a range where a tip of the blade swings in an axial direction of a rotation shaft relative to a predetermined reference position.

* * * * *